DIRECT-CURRENT RESTORER SYSTEM FOR COLOR TELEVISION RECEIVER

Filed Nov. 20, 1961 3 Sheets-Sheet 1

INVENTORS
WARREN H. MOLES &
ROLAND N. RHODES
BY
W. H. Spraagle
Attorney

DIRECT-CURRENT RESTORER SYSTEM FOR COLOR TELEVISION RECEIVER

INVENTORS
WARREN H. MOLES &
ROLAND N. RHODES
BY
[signature]
Attorney

INVENTORS
WARREN H. MOLES &
ROLAND N. RHODES
BY
[signature]
ATTORNEY

United States Patent Office 3,272,914
Patented Sept. 13, 1966

3,272,914

DIRECT-CURRENT RESTORER SYSTEM FOR COLOR TELEVISION RECEIVER

Warren H. Moles, Trenton, N.J., and Roland N. Rhodes, Levittown, Pa., assignors to Radio Corporation of America, a corporation of Delaware
Filed Nov. 20, 1961, Ser. No. 153,287
9 Claims. (Cl. 178—5.4)

This invention relates to color television receivers, and more particularly to circuits for processing and supplying image representative signals to a color image display device in a color television receiver.

One type of color image display device that may be used in a color television receiver is a cathode ray tube having an image reproducing phosphor screen that emits light under electron beam excitation, the color of the light being dependent upon the velocity of the electrons that excite the screen. This type of cathode ray tube may be called a "penetration color tube," because the color of the light is dependent upon the depth to which the electrons penetrate into the screen before they are stopped to cause light emission from the screen. The screen of a penetration color tube produces light of two or more primary colors when excited simultaneously by two or more electron beams, having different respective beam velocities so that each beam controls substantially only one of the colors that the screen may produce. Each electron beam is modulated in intensity with signals representative of the color that it is to control, and deflected horizontally and vertically to scan a raster on the tube screen in the usual manner in television receivers to produce a color light image.

In order to accelerate a plurality of separate electron beams in the same cathode ray tube to different velocities, it has been found practical to maintain the ultor or final accelerating anode of each of the separate electron guns that produce the beams at the same direct voltage, and to maintain the separate cathodes of the electron guns at different direct voltages. By this means the electron beams from the plurality of electron guns are accelerated through different potentials and thus acquire different velocities. Using screens that provide three primary colors (blue, green, and red) having purity and brightness of commercial quality, it has been found that the difference in accelerating potentials for the three electron beams is on the order of several thousand volts.

The radio frequency (RF) color television wave that is received and processed to display a color television image on any type of color image display device, includes, according to the present color television broadcasting standards, a composite color video signal that is amplitude modulated on a radio frequency (RF) picture carrier wave and an accompanying sound signal that is frequency modulated on a radio frequency (RF) sound carrier wave. The picture and sound waves are spaced 4.5 mc. (megacycles) apart. The composite color video signal includes a luminance (monochrome or black and white) signal, a color subcarrier wave that is phase and amplitude modulated with signals representative of the hue and saturation of the colors of the image, and horizontal and vertical blanking intervals, within which scanning and color synchronizing information are included.

Present commercial color television receivers use the "shadow mask" type cathode ray color television tube as a color image display device. The shadow mask color television tube has three electron guns to provide three electron beams and each beam excites a separate color light emitting phosphor on the screen of the tube. The velocities of the three electron beams are substantially identical.

Color television receivers using a shadow mask color television tube generally separate the luminance signal from the color subcarrier signal, and direct current (D.C.) couple the luminance signal through luminance signal amplifiers between the video detector of the receiver and the cathodes of the three electron guns of the shadow mask color television tube. The color subcarrier wave is demodulated to provide three separate color-difference signals that are alternating current (A.C.) coupled by capacitors to the control electrodes of the three electron guns. A color-difference signal is a signal that represents the difference between the luminance signal and a signal representative of one of the color components of the image, such as blue, green or red. The color-difference signals are combined with the luminance signal in the electron guns, themselves, to modulate the intensity of each of the electron beams in accordance with the color components of the image to be reproduced.

It will be apparent, however, that in a cathode ray tube in which the cathode potentials of the three electron guns are several kilovolts apart, such as in the operation in a penetration color tube, it would be impractial to D.C. couple the luminance signal to the cathodes, since the driving amplifiers would be subjected to high voltages, requiring the use of expensive electron tubes and circuitry.

In accordance with this invention, wherein the color television receiver uses as a color image display device a penetration color tube that has a plurality of electron guns, the cathodes of which are maintained at different direct potentials, a composite color video signal is processed to derive a plurality of individual color signals representative of the intensities of the color components of the image to be reproduced. The color signals are capacitively coupled to the control electrodes of the electron guns of the penetration color tube. Direct current (D.C.) restoring circuits for the color signals are provided between the control electrodes and cathodes of the separate electron guns. In addition, means are provided to generate and apply other operating direct voltages to the electron guns which may be required for operation.

As previously noted, in a color television receiver using a shadow mask color television tube, the luminance signal is D.C. coupled through luminance signal amplifiers to the cathodes of its electron guns. Manual control of the bias or D.C. level of one of the luminance amplifiers may thus be used to control the image brightness. This type of "brightness control" cannot be used if D.C. coupling of the luminance signal is not used. In accordance with this invention, an auxiliary pulse signal is added to the color signals to provide a level in the color signals to which the D.C. restoring circuits may clamp the signal. The pulse is controllable in amplitude to serve as a "brightness control." The auxiliary pulse signals are also used to provide horizontal and vertical blanking signals for the penetration color tube.

The invention may be further understood when the following detailed description is read in connection with the accompanying drawings in which.

Figure 2:
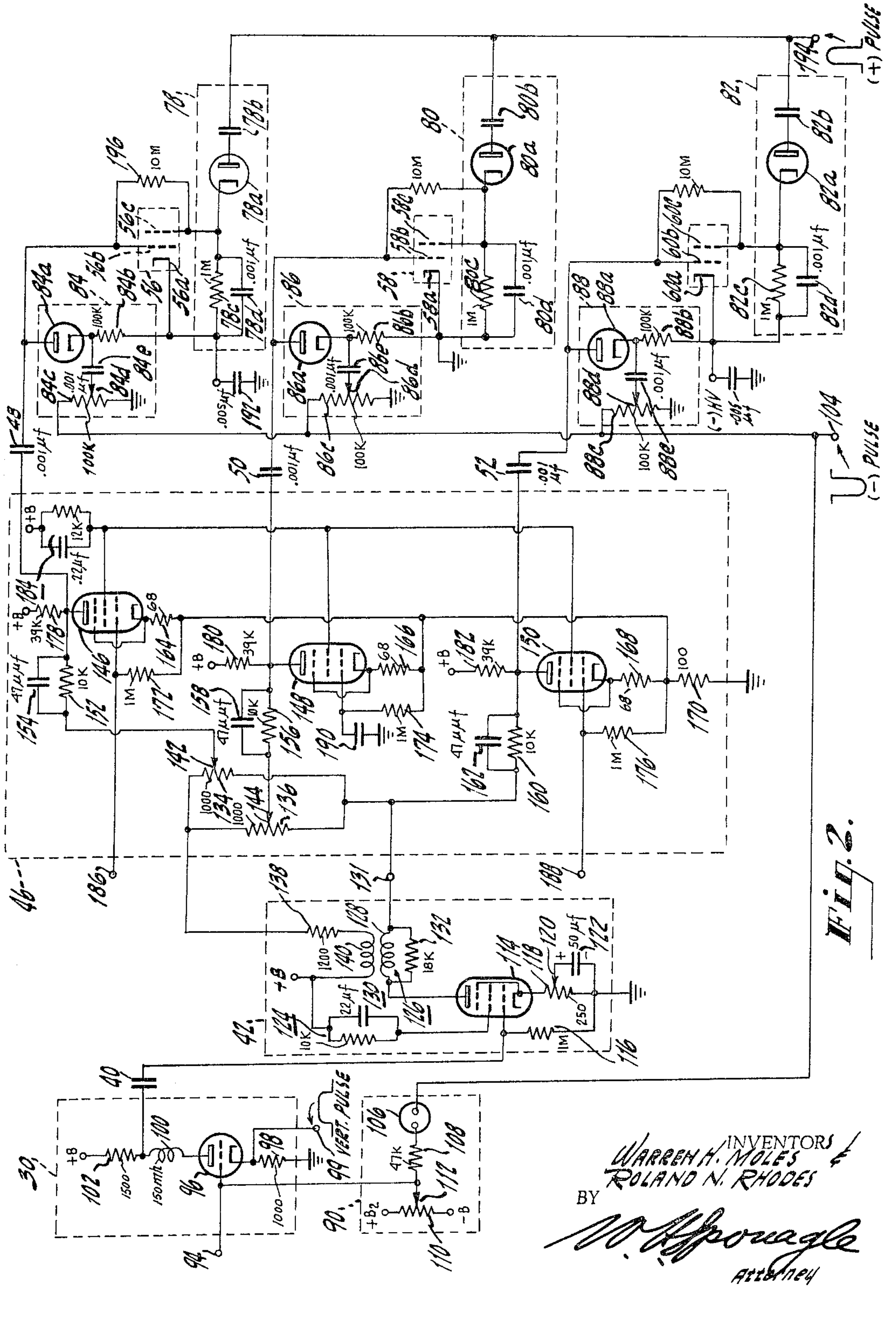
FIGURE 2 is a schematic circuit diagram of the signal processing circuits which may be used, in accordance with the invention, in the receiver shown in FIGURE 1.
Figures 3A, 3B, 3C, 4, 5:
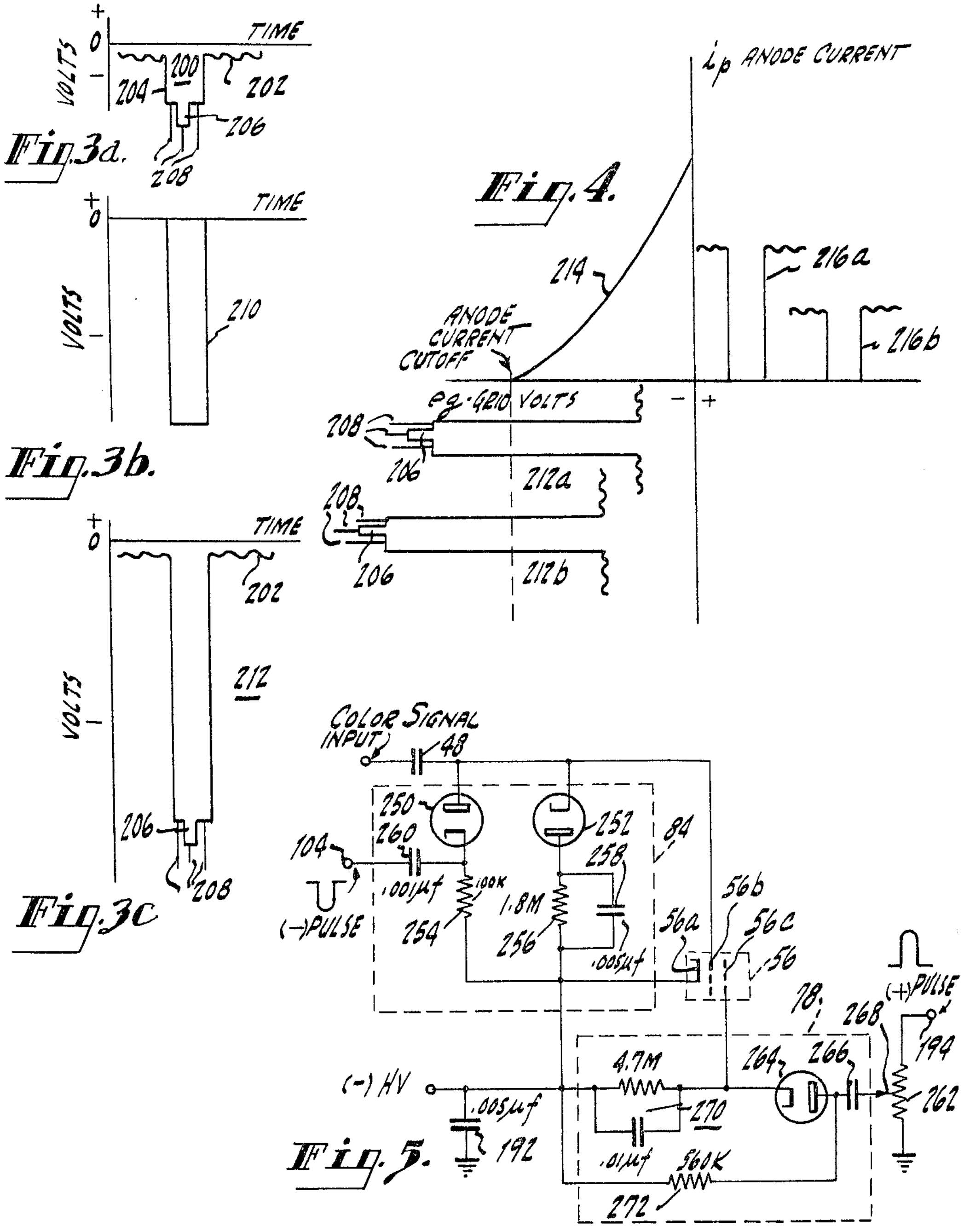

FIGURES 3*a–c* and 4 are graphs showing curves illustrating certain operational characteristics of the circuits of FIGURE 2; and FIGURE 5 is a modification of certain of the circuits shown in FIGURE 2 illustrating another embodiment of the invention.

Figure 1:
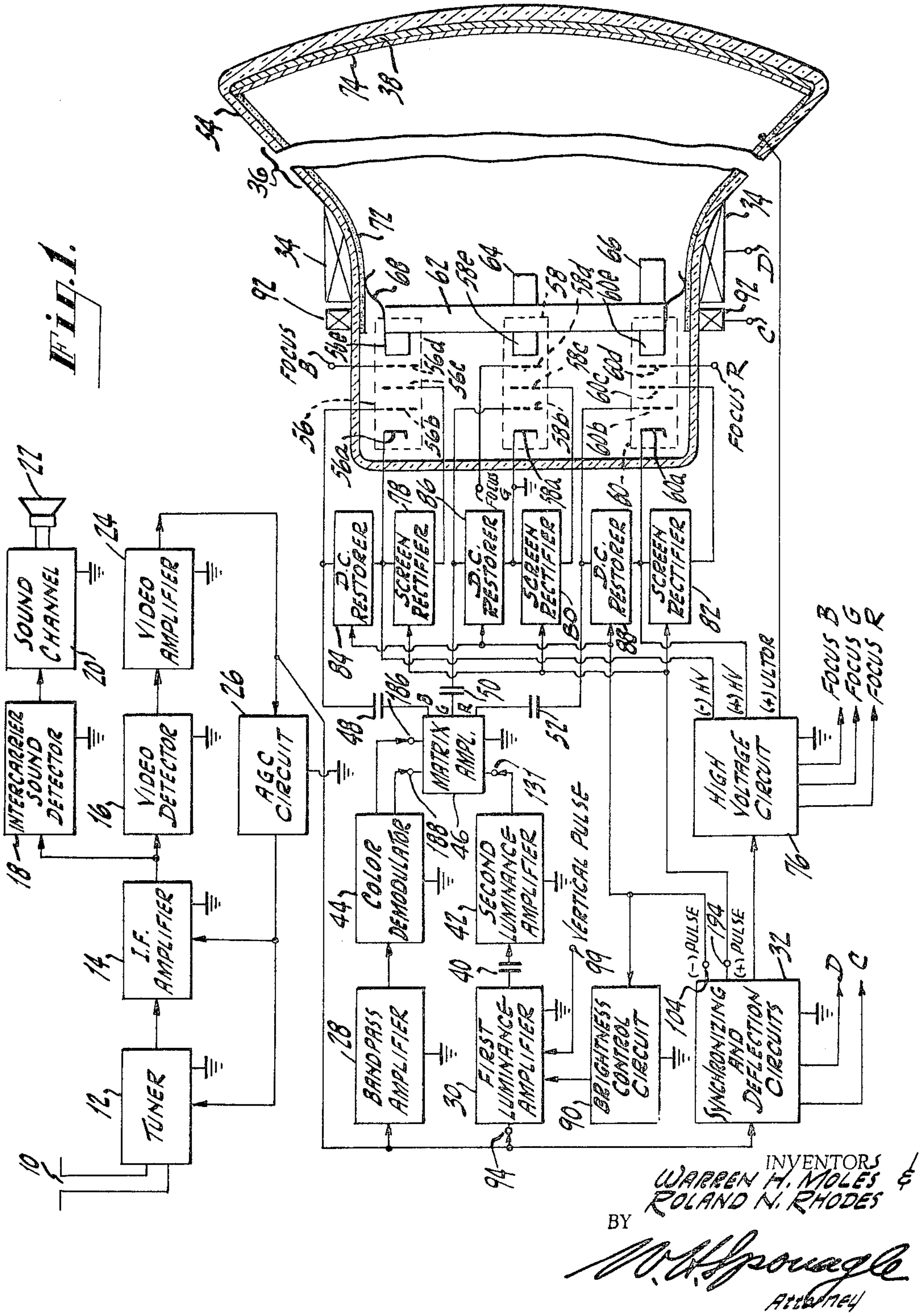
FIGURE 1 is a block diagram of a color television receiver utilizing a penetration color tube and including video signal processing circuits in accordance with the invention.

The color television receiver represented in FIGURE 1 includes an antenna 10 to intercept and supply a received RF color television wave to a tuner 12. The RF color television wave includes an RF picture carrier wave which is amplitude modulated with a composite color video signal and an RF sound carrier wave which is frequency modulated with a sound signal, spaced 4.5 megacycles from the RF picture wave, in accordance with present broadcasting standards. In the tuner 12, the received RF color television wave is heterodyned to an intermediate frequency (IF) wave (including an IF picture wave and an IF sound wave), which is applied to an IF amplifier 14 where it is amplified and supplied to a video detector 16 and an intercarrier sound detector 18.

The intercarrier sound detector 18 derives an intercarrier sound signal of 4.5 megacycles, frequency modulated with the sound signal, from the beat frequency between the IF picture wave and the IF sound wave. The intercarrier sound signal is applied from the intercarrier sound detector 18 to a sound channel 20 where it is amplified, detected, and applied to a loudspeaker 22 to reproduce the sound represented by the sound signal carried as modulated to the originally received RF sound wave.

The composite color video signal is detected by the video detector 16 from the IF picture wave, and is applied to a video amplifier 24 where it is amplified and applied to several points in the receiver for further processing, i.e., to an automatic gain control (AGC) circuit 26, a bandpass amplifier 28, a first luminance amplifier 30 (through a luminance signal input terminal 94), and synchronizing and deflection circuits 32.

As is known, the AGC circuit 26 generates a control voltage that is responsive to the strength of the composite color video signal and supplies it to the tuner 12 and IF amplifier 14 of the receiver to control their respective gains. The synchronizing and deflection circuits 32 of the receiver generate signals that may be applied to an electromagnetic electron beam deflection yoke 34 surrounding the neck of a penetration color tube 36 to deflect the electron beams of the tube 36 to scan television rasters on a light emitting phosphor screen 38 of the tube 36 is synchronism with the synchronizing signals of the composite video signal.

The first luminance amplifier 30 amplifies the luminance signal portion of the composite color video signal and applies it through a coupling capacitor 40 to a second luminance amplifier 42 for further amplification.

The bandpass amplifier 28 separates and amplifies the color subcarrier wave and applies it to a color demodulator 44 which derives a pair of output signals representative of the color information contained in the color subcarrier wave.

The output signals from the color demodulator 44 and the luminance signal from the second luminance amplifier 42 are applied through terminals 186, 188 and 131, respectively, to a matrix-amplifier 46 which derives therefrom individual output components of the image, i.e. "blue" signals, "green" signals and "red" signals, available on the leads marked B, G and R, respectively. The blue, green and red signals are applied through coupling capacitors 48, 50 and 52, respectively, to the three electron guns of the penetration color tube 36.

The luminance amplifiers 30, 42, the bandpass amplifier 28, and the color demodulator 44 may be of the types that are presently used in commercial color television receivers using the shadow-mask type color television tube.

The penetration color tube 36 has an envelope 54 within which are included the light emitting phosphor screen 38 and a trio of electron guns 56, 58 and 60. The first gun 56 will be hereinafter referred to as the "blue" gun; the second gun 58 as the "green" gun; and the third gun 60 as the "red" gun. The screen 38 is of the type that emits light under electron excitation, the color of the light being dependent on the velocity of the exciting electrons. The screen 38 may be, for example, constructed in the manner specified in U.S. Patent No. 2,590,018, issued on March 18, 1952, to L. R. Koller et al., and entitled, "Production of Color Images."

The electron guns 56, 58, 60 each contain, respectively, cathodes **56*a*, 58*a*, 60*a*; control electrodes 56*b*, 58*b*, 60*b*; screen electrodes 56*c*, 58*c*, 60*c*; focus electrodes 56*d*, 58*d*, 60*d* and acceleratng anodes 56*e*, 58*e*, 60*e*. The accelerating anodes 56*e*, 58*e*, 60*e* are electrically connected to a convergence cage 62 (common to all three guns 56, 58, 60) which may be similar to the convergence cages presently used with the shadow mask color television tube, and includes individual magnetic pole pieces (not shown) associated with each electron gun 56, 58, 60, and arranged such that external magnetic fields may be applied through the envelope 54 to the pole pieces to control the position of each of the electron beams, individually. One type of convergence system that may be used is shown, for example, in U.S. Patent No. 2,707,248, issued on April 26, 1955, to H. C. Goodrich, entitled "Electromagnetic Beam-Convergence Systems for Tri-Color Kinescopes." While the electron guns 56, 58, 60** are shown side-by-side for clarity of illustration, it is to be understood that they may be mounted in the tube in the same manner as in a shadow mask color television tube, i.e., each equidistant from a common axis and spaced apart by equal angles.

Positioned between the green gun 58 and the screen 38 is a first magnetic shield member 64 which serves to shield the electron beam emitted by the green gun 58 from the effect of a magnetic electron beam deflecting field applied to the tube 36 by the yoke 34 for a portion of the beam travel through the deflecting region of the tube 36. The deflecting region is between the guns 56, 58, 60 and the screen 38 and adjacent the guns 56, 58, 60, as will be explained in greater detail hereinafter. A second magnetic shield member 66, longer than the first magnetic shield member 64, is positioned between the red gun 60 and the screen 38 so that the electron beam from the red gun 60 is shielded from the action of the beam deflecting field for a longer portion of its travel through the deflecting region of the tube 36 than is the green beam.

The convergence cage 62 is connected by contact strips 68, 70 to a conductive coating 72 on the inner surface of the envelope 54. The conductive coating 72 may be "aquadag," which is used as an internal conductive coating in many present commercial black and white and shadow mask color television tubes. The conductive coating 72, is, in turn, connected to an aluminum backing 74 on the screen 38.

An accelerating voltage, (+) ultor voltage, is derived from high voltage circuits 76 for the receiver and applied through the envelope 54 to the conductive coating 72. Thus, the conductive coating 72, the aluminum backing 74, the accelerating anodes **56*e*, 58*e*, 60*e*, the convergence cage 62, and the magnetic shield members 64 and 66** are maintained at the (+) ultor voltage.

The high voltage circuits 76 for generation of the (+) ultor voltage may be of the well known "flyback" type in which high voltages are generated by rectification of horizontal retrace or flyback pulses from the horizontal output transformer of television receiver horizontal electron beam deflection systems. In addition, a positive high voltage, (+) HV voltage, and a negative high voltage, (−) HV voltage, both less in absolute value than the (+) ultor voltage, are available from the high voltage circuit 76 and may also be generated by a "flyback" type circuit. The (−) HV voltage is applied to the cathode **56*a* of the blue gun 56 and the (+) HV voltage is applied to the cathode 60*a* of the red gun 60. The cathode 58*a* of the green gun is connected to ground (that is, a point of reference potential) for the receiver. The total accelerating voltage for the blue gun 56 is the sum of the absolute values of the (—) HV voltage and the (+) ultor voltage; the accelerating voltage for the green gun 58** is equal to the (+) ultor voltage; and the accelerating voltage for the red gun is equal to the difference between the absolute values of the (+) ultor voltage and the (+) HV voltage.

Also available from the high voltage circuits 76 are three direct focus voltages, positive with respect to ground, which are labeled Focus B, Focus G and Focus R. The Focus B voltage is applied to the focus electrode 56*d* of the blue gun 56, the Focus G voltage is applied to the focus electrode 58*d* of the green gun 58, and the Focus R voltage is applied to the focus electrode 60*d* of the red gun 60. The focus voltages, as is known, maintain the electron beams from the electron guns 56, 58, 60 properly shaped.

Screen voltages for the screen electrodes 56*c*, 58*c*, 60*c* of the electron guns 56, 58, 60 are derived by three screen rectifiers 78, 80, 82 connected, respectively, between the cathodes 56*a*, 58*a*, 60*a* and screen electrodes 56*c*, 58*c*, 60*c*. A positive voltage pulse, (+) pulse signal, derived from the horizontal flyback pulse during the horizontal blanking interval appearing in the synchronizing and deflection circuits 32 is applied through a (+) pulse terminal 194 to the screen rectifiers 78, 80, 82 to provide signal for rectification to the direct voltages required.

In order to bias the control electrodes 56*b*, 58*b*, 60*b*, of the electron guns 56, 58, 60, three direct current (D.C.) restorers 84, 86, 88 are connected, respectively, between the cathodes 56*a*, 58*a*, 60*a* and the control grids 56*b*, 58*b*, 60*b*. The D.C. restorers 84, 86, 88 are keyed by a negative voltage pulse, (—) pulse signal, applied through a (—) pulse terminal 104, derived from the horizontal flyback pulses appearing in the synchronizing and deflection circuits 32 to set the voltage level of the negative-most portion of the color signals from the matrix-amplifier 46 which are coupled through coupling capacitors 48, 50, 52, respectively, and across the D.C. restorers 84, 86, 88 to the control electrodes 56*b*, 58*b*, 60*b*, respectively.

A brightness control circuit 90 is connected to the first luminance amplifier 30 and receives as an input signal the (—) pulse signal derived from the synchronizing and deflection circuits 32. The circuitry and operation of the brightness control circuit 90 will be described hereinafter.

In order to deflect the electron beams from the electron guns 56, 58, 60 to scan television rasters on the screen 38, the electromagnetic deflection yoke 34, surrounding the neck of the tube 36 is driven by deflection signals from the synchronizing and deflection circuits 32 to provide a time varying magnetic field in the deflecting region of the tube 36, that is, in the space immediately adjacent the guns 56, 58, 60 through which the electron beams from the guns must traverse to strike the screen 38. The amount of deflection imparted to an electron beam is directly proportional to the strength of the magnetic field and the length of field through which the beam must pass, and inversely proportional to the square root of the velocity of the electrons. Thus, if three different velocity electron beams traversed the same magnetic field through the same distance in the deflecting region of the tube 36, they would be deflected by different amounts and would not strike the screen 38 at the same point. The blue beam which has the greatest velocity would not be deflected through as great an angle, by a given magnetic field, as would the red beam which has the least velocity. In like manner, the green beam would be deflected through a greater angle than the blue beam but not as great as the red beam, since it is traveling at a slower velocity then the blue beam although at a faster velocity than the red beam.

It is necessary, however, to insure that the electron beams converge at substantially the same point on the screen from all three guns 56, 58, 60 throughout all deflection angles, and it is for this reason that the magnetic shield members 64, 66 are used. The magnetic shield members 64, 66 are made of a magnetic material to prevent the deflecting field of the yoke 34 from affecting an electron beam while the beam is within the shield member. The first magnetic shield member 64 is made of a length such that the green beam is effectively within the deflecting region of the tube 36 for a shorter distance than the blue beam so that it will receive essentially the same degree of deflection, by a particular magnetic field, as the blue beam. The second magnetic shield member 66 is longer than the first magnetic shield member 64 so that the red beam is effectively within the deflecting region of the tube 36 for a shorter distance than both the green and blue beams so that its degree of deflection will be substantially the same as that of the green and blue beams.

It will also be seen that, as in the shadow mask color television tube, the three electron beams originante from the spaced points within the tube, and in order for the beams from the three guns 56, 58, 60 to strike the screen 38 at the same point, even after compensation for their varying velocities by the magnetic shield members 64, 66, some additional form of beam convergence action is necessary. The additional convergence action is supplied by convergenve signals which may be generated by the synchronizing and deflection circuits 32 in a known manner (see previously cited U.S. Patent No. 2,707,248) and applied to a convergence yoke 92, positioned on the outside of the envelope 54 of the tube 36 over the convergence cage 62, to apply individual convergence magnetic fields to the electron beams through the convergence cage 62 to modify, independently, the positions of the individual electron beams so that they converge at all points on the rasters scanned on the screen 38.

Many of the circuits described in connection with the color television receiver of FIGURE 1 are presently known and used in television receivers using the shadow mask color television tube. FIGURE 2 shows specific circuitry which may be used, in accordance with the invention, for the first and second luminance amplifiers 30, 42, the brightness control circuit 90, the matrix-amplifier 46, the D.C. restorers 84, 86, 88 and screen rectifiers 78, 80, 82.

In FIGURE 2 a negative-going video signal (available from the video amplifier 24 of FIGURE 1) is applied to the luminance input terminal 94 of the first amplifier 30, which is connected to the control grid of a first luminance amplifier tube 96, that has its cathode connected to ground for the receiver through a bias resistor 98, and its anode connected to a source of operating potential, +B, through a high frequency peaking coil 100 and a first video load resistor 102. A negative-going video signal is one in which the synchronizing signals extend in a negative direction from the image signals.

The (—) pulse signals (which may be derived from the horizontal flyback pulses and is available from the synchronizing and deflection circuits 32 shown in FIGURE 1) are applied to the control grid of the first luminance amplifier tube 96 through a (—) pulse signal input terminal 104 and the series combination of a neon tube 106 and an isolating resistor 108. The neon tube 106 serves to prevent any extraneous noise signals from being applied to the first luminance amplifier tube 96 between occurrences of the (—) pulse signals. A brightness control potentiometer 110, having a pair of end terminals and a variable tap 112, has one end terminal connected to the source of low voltage operating potential, +B, for the receiver; the other end terminal connected to a source of negative operating potentials, —B; and the variable tap 112 connected to the control grid of the first luminance amplifier tube 96. The luminance signal is modified during the blanking interval by applying the (—) pulse signals to insure that the first luminance amplifier tube 96 is always driven to anode current cutoff during the blanking interval of the luminance signals. The cutting off of the first luminance amplifier tube during the horizontal blanking interval provides a horizontal blanking pulse in the luminance signal to prevent brightening of the horizontal retrace lines on the screen 38 of the penetration color tube 36. As will be more fully explained hereinafter, the amplitude (or height) of the horizontal blanking pulses determines the brightness of the image reproduced by the receiver and the amplitude is controlled by the setting of the tap 112 on the brightness control potentiometer 110. The horizontal blanking pulse height control action is more easily understood by considering the waveforms shown in FIGURES 3 and 4.

FIGURE 3*a* illustrates the luminance signal waveform 200 that is applied to the control grid of the first luminance amplifier 96 of FIGURE 2, and includes an image portion 202, a horizontal blanking interval 204, a synchronizing signal 206 and extraneous noise pulses 208. The (−) pulse signal, also applied to the control grid, is illustrated as the waveform 210 in FIGURE 3*b* and occurs substantially coincident in time with the horizontal blanking interval 204 of the luminance signal 200. The sum of the luminance signal 200 of FIGURE 3*a* and the (−) pulse signal 210 of FIGURE 3*b* is shown as a combined signal 212 in FIGURE 3*c*. Note that the synchronizing pulse 206 and the noise pulses 208 are at the extreme negative-going portions of the combined signal 212.

Referring now to FIGURE 4, the transfer characteristics of the first luminance amplifier tube 96 are shown as curve 214 in a plot of the grid voltage ($e_g$) of the tube 96 against the anode current ($i_p$). Two combined signals 212*a* and 212*b*, that have different direct voltage components which are otherwise identical to the combined signal 212 shown in FIGURE 3*c*, are shown plotted along the $e_g$ axis. Anode current cutoff of the first luminance amplifier 96 is shown by the intersection of the curve 214 with the $e_g$ axis. The negative going portions of both the combined signals 212*a*, 212*b* extend beyond anode current cutoff and any extraneous noise that may appear in the luminance signal during the horizontal blanking interval does not appear in the anode output current, as illustrated by anode current curves 216*a*, 216*b* corresponding, respectively, to the combined signals 212*a*, 212*b*. The position of the combined signals 212*a*, 212*b* along the $e_g$ axis is determined by the direct voltage content of the signal. The composite color video signal (from which the luminance signal is derived) includes a direct voltage component, and a further direct current component may be selectively added to or subtracted from the luminance signal in accordance with the position of the tap on the brightness potentiometer 110. Variation of the tap 112 on the potentiometer 110 varies the position of the composite signal on the $e_g$ axis, as shown by the two combined signals 212*a* and 212*b* in FIGURE 4. By this means, a modified luminance signal is obtained from the first luminance amplifier 96 that includes a horizontal blanking pulse portion, occurring during the horizontal blanking interval, having an amplitude that may be selected by positioning the tap 112 on the brightness potentiometer 110. The added (−) pulse signal 210 of FIGURE 3*b* is made large to insure that the first luminance amplifier 96 is always driven beyond anode current cutoff by the combined signals 212*a* and 212*b* as shown in FIGURE 4. As will be explained in greater detail hereinafter, the D.C. restorers 84, 86, 88 clamp the peak of the horizontal blanking pulse of the luminance signal at current cutoff bias for the electron guns 56, 58, 60, and thus provide horizontal retrace blanking for the penetration color tube 36; and, the amplitude of the horizontal blanking pulses determine the intensity of the electron beams that are modulated by the signals that are applied to the guns 56, 58, 60 and thus control the brightness of the image reproduced by the penetration color tube 36.

Vertical retrace blanking of the penetration color tube 36 cannot be performed by simply adding vertical pulses to the composite video signal, because the horizontal blanking pulses continue to occur during the vertical blanking interval and would thus add to and appear on the vertical pulses. The D.C. restorers 84, 86, 88 would then clamp on the horizontal blanking pulses, instead of the added vertical pulse, with the result that the electron guns 56, 58, 60 would be conducting current during the vertical blanking interval, except when a horizontal blanking pulse was occurring. Vertical retrace blanking may be performed, however, by cutting off the first luminance amplifier tube 96 in a manner similar to that used to generate the horizontal blanking pulses. A positive-going vertical pulse (from the vertical windings of the yoke 72 or from the usual vertical output tube in the receiver) is applied to the cathode of the first luminance amplifier 96 through a vertical pulse terminal 99. The vertical pulse is made large enough to insure that the first luminance amplifier tube 96 is cut off for the duration of the vertical pulse. The resultant vertical blanking pulses that appear in the anode circuit of the first luminance amplifier tube 96 thus do not include any horizontal blanking pulses and the D.C. restorers 84, 86, 88 clamp on the vertical blanking pulses to cut off current in the electron guns 56, 58, 60 during the vertical blanking interval. The setting of the tap 112 on the brightness control potentiometer 110 also fixes the height of the vertical blanking pulses, because the setting detemines the grid bias of the first luminance amplifier tube 96 and thus fixes the voltage required to cut off anode current, whether the voltage is applied to the control grid (as with the (−) pulse horizontal signal) or the cathode (as with the positive-going vertical pulse).

The amplified and modified luminance output signal from the first luminance amplifier 96 is applied from the junction of the peaking coil 100 and the first video load resistor 102 through the coupling capacitor 40 to the control grid of a second luminance amplifier tube 114. A grid return resistor 116 is connected between the control grid and ground for the receiver, and the cathode is connected to ground through a cathode bias potentiometer 118 having a variable tap 120, which is also connected to ground through a large capacitor 122. Variation of the position of the tap 120 on the potentiometer 118 serves as a constrast control for the receiver, because the capacitor 122 may be positioned to bypass all or a portion of the potentiometer 118 and thus change the gain of the second luminance amplifier tube 114, by feedback across the potentiometer 118. The screen grid of the second luminance amplifier tube 114 is connected to the source of operating potential, +B, through a resistor-capacitor network 124, and the suppressor electrode is connected directly to the cathode. The anode of the tube 114 is connected to the source of operating potential, +B, through the series combination of a high frequency peaking circuit 126 (which consists of the parallel combination of the primary winding 128 of a transformer 130 and a resistor 132); a blue drive potentiometer 134 and a green drive potentiometer 136 connected in parallel; a resistor 138; and the secondary winding 140 of the transformer 130. Each of the potentiometers 134, 136 have adjustable taps 142, 144.

The luminance signal, including the added horizontal and vertical blanking pulses, is amplified by the second luminance amplifier tube 114 and is available at the end of the high frequency peaking circuit 126 remote from the anode of the tube 114 and is applied to three matrix amplifier tubes 146, 148 and 150, which are pentode type electron tubes. A portion of the luminance signal selected by the position of the variable tap 142 on the blue drive potentiometer 134 is applied through a first isolating resistor 152, shunted by a capacitor 154, to the anode of a first matrix amplifier tube 146. In like manner, a portion of the luminance signal is applied from the variable tap 144 on the green drive potentiometer 136 through a second isolating resistor 156, shunted by a capacitor 158, to the anode of a second matrix amplifier tube 148. Finally, the full luminance signal, from the end of the high frequency peaking circuit 126 remote from the anode of the second luminance amplifier tube 114, is applied through a third isolating resistor 160, shunted by a capacitor 162, to the anode of the third matrix amplifier tube 150.

The cathodes of the three matrix amplifier tubes 146, 148, 150 are connected, respectively, through individual cathode resistors 164, 166, 168 and through a common cathode resistor 170 to ground for the reeciver. The control grids are connected, respectively, through grid resistors 172, 174, 176 to the common cathode resistor 170, and the suppressor grids are each connected directly to their respective cathodes. The anodes are connected individually through load resistors 178, 180, 182, respectively, to the source of operating potential, +B, and the screen grids are connected, in common, through a resistor-capacitor network 184 to the source of operating potential, +B. The control grid of the first matrix amplifier tube 146 is also connected to a first signal input terminal 186, and the control grid of the third matrix amplifier tube 150 is connected to a second signal input terminal 188. The control grid of the second matrix amplifier tube 148 is connected to ground for signal frequencies through a capacitor 190.

The signals applied to the first and second signal input terminals 186, 188 are derived from the color demodulator 44 shown in FIGURE 1. The color demodulator 44 may be of the type described in U.S. Patent No. 2,830,112, issued to D. H. Pritchard on April 8, 1958, and entitled "Color Television," to derive, from the color subcarrier wave, color representative "X" and "Z" color difference signals. The "X" signal is applied to the first input terminal 186 and the "Z" signal is applied to the second input terminal 188. The matrix amplifier tubes 146, 148, 150 perform the function of the matrix adder described in the aforementioned Pritchard Patent 2,830,112, and there appears at the respective anodes of the matrix-amplifier tubes 146, 148, 150, as a result of the matrixing of the "X" and "Z" signals, color difference signals, i.e., a blue signal minus a luminance signal $(B-Y)$, a green signal minus the luminance signal $(G-Y)$, and a red signal minus the luminance signal $(R-Y)$. The luminance signal (Y), including the added horizontal and vertical blanking pulses, is also applied to the anodes of the tubes 146, 148, 150 from the second luminance amplifier tube 114, as previously explained. The resultant signals at the individual anodes of the matrix-amplifier tubes 146, 148, 150 is the sum of the two signals appearing at the anodes, i.e., $(B-Y)+(Y)$ or the blue signal (B) at anode of the first tube 146, $(G-Y)+(Y)$ or the green signal (G) at anode of the second tube 148, and $(R-Y)+(Y)$ or the red signal at anode of the third tube 150. The blue, green, and red signals each contain the added horizontal and vertical blanking pulses of the luminance signal.

Because the color signals (B, G, and R) appear individually at the anodes of the matrix-amplifier tubes 146, 148, 150, it is necessary to insure that the color signal from one matrix-amplifier tube does not feedback through the anode circuit of the second luminance amplifier 114 to the control grids of the other matrix-amplifier tubes. The isolating resistors 152, 156, 160 reduce this undesired feedback. As an example, consider a luminance signal being conveyed from the anode circuit of the second luminance amplifier 114 to the anode of the third matrix amplifier 150. The luminance signal is developed across a voltage divider comprising the third isolating resistor 160 and the load resistor 182 of the tube 150. The third isolating resistor 160 is shunted by a capacitor 162 to match the stray capacitance from the anode to ground effectively shunting the load resistor 182. Typical values for the components of the circuit are shown in FIGURE 2 of the drawing. The isolating resistor 160 is 10,000 ohms and the load resistor 182 is 39,000 ohms. Thus about 80%

$$\frac{39{,}000}{39{,}000+10{,}000}\times 100$$

of the luminance signal is applied to the anode of the tube 150.

The action towards a feedback signal in the opposite direction, that is, from the matrix-amplifier tube 150 of the second luminance amplifier anode circuit, is different. The feedback signal is developed across a voltage divider comprising the third isolating resistor 160 and the impedance of the anode circuit of the second luminance amplifier tube 114. As can be seen from the circuit values shown in FIGURE 2 of the drawing, the impedance of the luminance amplifier anode circuit presented to the third matrix amplifier tube 150 is approximately 1,700 ohms (resistors 138, 1,200 ohms, in series with the parallel combination of potentiometers 134, 136. 500 ohms). Thus only about 14%

$$\frac{1{,}700}{1{,}700+10{,}000}\times 100$$

of the feedback signal appears in the luminance amplifier anode circuit. For all practical purposes, the 80% to 14% ratio effectively isolates the luminance amplifier circuit from signals in the anode circuit of the third matrix amplifier tube 150.

The isolating action between the anode circuit of the second luminance amplifier tube 114 and the first and second matrix-amplifier tubes 146, 148 is similar.

The "blue" signal available at the anode of the first matrix-amplifier tube 146 is applied through the coupling capacitor 48 to the control grid **56*b* of the blue gun 56. Note that for the purposes of simplicity, only portions of the three electron guns 56, 58, 60 of the tube 36 in FIGURE 1 have been shown in FIGURE 2. The cathode 56*a* of the blue gun 56 is connected to the (—) HV voltage, as explained in connection with FIGURE 1, and bypassed to ground at signal frequencies through a capacitor 192**.

The D.C. restorer 84 (shown in block form in FIGURE 1) comprises a diode **84*a* which has its anode connected to the control grid 56*b* and its cathode connected through a resistor 84*b* to the cathode 56*a* of the blue gun 56. Keying pulses, which are the (—) pulse signals available at the terminal 104, are developed across a keying pulse potentiometer 84*c* and a portion of each keying pulse is applied from an adjustable tap 84*d* on the potentiometer 84*c* through a capacitor 84*e* to the cathode of the D.C. restorer diode 84*a***.

The D.C. restorer 84, in operation, serves to clamp the negative going portions of the blue signal applied to the control electrode **56*b* of the electron gun 56 at a particular voltage level with respect to the cathode 56*a*. Specifically, the amplitude of the negative-going horizontal and vertical blanking pulses of the blue signal applied to the control grid 56*b* are set, as previously explained, by the position of the tap 112 on the brightness potentiometer 110, and the D.C. restorer 84 clamps the peak of these pulses to the potential of the cathode of the diode 84*a*. The cathode potential of the diode 84*a* is set by selecting a portion of the (—) pulse signal that appears across the keying pulse potentiometer 84*c* and applying it through the adjustable tap 84*d* and the capacitor 84*c* to the cathode of the diode 84*a*. The only time that the diode 84*a* can conduct is during the keying pulse interval, and the negative-going horizontal and vertical blanking pulses of the blue signal are prevented from going more positive than the amplitude of the negative keying pulse appearing on the cathode of the diode 84*a* by the conduction of the diode 84*a***.

It will be seen that the amplitude of the horizontal and vertical blanking pulses of the blue signal determines the position of blue signal on the grid voltage-ultor current transfer characteristics of the blue gun 56. At low amplitudes of the pulse, the blue signal is nearer ultor current cutoff than it is at high amplitudes of the pulses. As a consequence, high amplitudes of the pulses produce a brighter image than low amplitudes of the pulses.

The brightness control circuit has an additional advantages, in that it provides a noise free level in the blue signal on which to effect the D.C. restoration. As is known, the D.C. restoration can be made to clamp on the peak of the synchronizing pulse 206 shown in FIGURE 3*a*. However, if noise pulses 208 occur during the clamping interval, the D.C. restorers 84, 86, 88 could set up on the noise pulses rather than the synchronizing pulse and give an incorrect bias to the electron gun 56.

The screen rectifier 78 (shown in block form in FIGURE 1) includes a rectifier diode 78*a* having its anode connected through a coupling capacitor 78*b* to the (+) pulse signals (available as horizontal flyback pulses from the synchronizing and deflection circuits 32 shown in FIGURE 1) at a (+) pulse signal input terminal 194. The cathode of the rectifier diode 78*a* is connected to the cathode 56*a* of the blue gun 56 through a load resistor 78*c* shunted by a capacitor 78*d*. A rectified direct voltage is available at the cathode of the rectifier diode 78*a* and is connected directly to the screen electrode 56*c* of the blue gun 56.

A direct current return resistor 196 for both the D.C. restorer 84 and the screen rectifier 78 is connected directly between the screen electrode 56*c* and the control electrode 56*b*.

The D.C. restorers 86, 88 and the screen rectifiers 80, 82 connected to the green gun 58 and the red gun 60, respectively, are identical in structure and operation with respect to the green and red signals to those described in connection with the blue gun 56.

The alternating current (A.C.) coupling of the color signals to the control grids of the electron guns 56, 58, 60, through the coupling capacitors 48, 50, 52, together with the D.C. restoration, prevents color temperature drift of the reproduced image on the screen 38 of the tube 36, which may be possible with D.C. coupled signals. By color temperature is meant the mixture of colors (red, blue, and green) reproduced on the screen 38 of the tube 36 to provide a desired white color. In a D.C. coupled circuit, the D.C. levels determine the color temperature, and if one level should drift or change by a different amount than another, the color temperature of the light emitted by the screen 38 would change.

The adjustment or set up procedure for the receiver is relatively simple. The screen voltage for each of the electron guns 56, 58, 60 remains fixed. With no signal present in the receiver, the taps 84*d*, 86*d*, 88*d* on the keying pulse potentiometers 84*c*, 86*c*, 88*c* are adjusted so that each electron gun is set just at cathode cut off. This provides the so-called "background" adjustment. For proper color balance in the reproduced image, the reproduction of a white signal must be made of a mixture of all three colors in a fixed ratio, whether the system is reproducing the brightest white of which it is capable or whether it is making some shade of gray. This adjustment is made with a received signal present, which may be from a test generator. The white balance is adjusted by varying the position of the taps 142, 144 on the blue and green drive potentiometers 134, 136 in the anode circuit of the second luminance amplifier tube 114, until the desired "white" mixture is obtained. By these two adjustments, the grid voltage-ultor current transfer characteristics of each of the electron guns 56, 58, 60 are matched at two points, that is, at the current cutoff point and at a highlight point, and the white balance of any point in between remains substantially constant.

It may be desired to utilize a double diode D.C. restorer between the control grids and the cathodes of the electron guns 56, 58, 60, instead of the single diode D.C. restorer shown in FIGURE 2, in order to fix the proper bias on the electron guns 56, 58, 60, regardless of whether the loading of the power supplies by the current in the guns causes a momentary increase or decrease of the voltages applied to the cathodes and accelerating anodes of the guns. A double diode D.C. restorer is shown in FIGURE 5, which is a schematic circuit diagram of a single electron gun, the blue gun 56, together with its associated D.C. restorer 84 and screen rectifier 78. The D.C. restorer 84 comprises a pair of diodes 250, 252. The first diode 250 has its anode connected directly to the control grid 56*b* of the blue gun 56 and its cathode connected through a resistor 254 to the cathode 56*a* of the blue gun 56. The second diode 252 has its cathode connected directly to the control grid 56*b* of the blue gun 56 and its anode connected through a resistor-capacitor circuit, comprising a load resistor 256 shunted by a capacitor 258, to the cathode 56*a* of the blue gun 56. The blue signal, which is available from the matrix amplifier tubes 146, 148, 150, shown in the circuit of FIGURE 2, is coupled through the coupling capacitor 48 to the control grid 56*b* of the blue gun 56. A keying pulse for the operation of the D.C. restorer 84, which is the (−) pulse signal available at the terminal 104 of the circuit shown in FIGURE 2, is applied through a pulse coupling capacitor 260 to the junction of the cathode of the first diode 250 and the resistor 254.

In operation, the keying pulse conditions the D.C. restorer 84 for operation. If the keying pulse is, for example, 100 volts in amplitude, the cathode of the first diode 250 will be pulsed to an amplitude of 100 volts, and the anode of the second diode 252 will be held continuously at approximately 100 volts by the parallel connected resistor 256 and capacitor 258. Thus, if the horizontal and vertical blanking pulses of the blue signal are more positive than 100 volts, the first diode 250 conducts to restore them to their proper level. If the pulses are more negative than 100 volts, the second diode 252 conducts to restore them to their proper level. The proper bias between the control grid 56*b* and cathode 56*a* of the blue gun 56 is thus maintained.

The screen rectifier 78 shown in FIGURE 5 is similar to that shown in FIGURE 2, except that the amplitude of the (+) pulse signal applied thereto for rectification is made variable by connecting a (+) pulse signal potentiometer 262 across the (+) pulse signal input terminal 194 (of FIGURE 2) and connecting a screen rectifier diode 264 through a coupling capacitor 266 to an adjustable tap 268 on the potentiometer 262. The amplitude of the (+) pulse signal rectified by the screen rectifier diode 264 is adjustable and provides an adjustable direct voltage across the resistor-capacitor circuit 270 of the diode 264, which is applied directly to the screen grid 56*c* of the blue gun 56. A direct current return for the screen rectifier diode 264 is provided by a resistor 272 connected between the anode of the diode 264 and the cathode 56*a* of the blue gun 56.

The D.C. restorer circuits 86, 88 and screen rectifiers 80, 82 for the green and red guns 58, 60, respectively, are identical in structure and operation to those for the blue gun 56.

If the D.C. restorers and screen rectifiers shown in FIGURE 5 are used in place of those shown in FIGURE 3, the set up procedure described in connection with FIGURE 3, is substantially the same, with the exception that the (+) pulse signal potentiometer 262 is adjusted to provide the anode current cutoff point in the electron guns instead of the keying pulse potentiometers of the FIGURE 2 circuit, which are not used in the FIGURE 5 circuit. The color balance adjustment is the same as that described in connection with FIGURE 2.

One problem may arise in connection with the circuit shown in FIGURE 5 if a manual chrominance or color gain control is used in the receiver. As is known, a manual chrominance control for the color signals may be provided by a manual gain control on the bandpass amplifier 28 shown in FIGURE 1. If this control is adjusted to a point to introduce substantially more color into the reproduced image than was present in the received signal (that is, to provide substantially more overall receiver gain for the color signals than for the luminance signal), the color signals applied to the electron guns 56, 58, 60 may be driven into the blacker than black region, causing conduction of the second diode 252 in the D.C. restorer circuit 84 of FIGURE 5 during the image interval, to give an incorrect image on the screen 38 of the tube 36. In order to prevent such a situation, a portion of the (+) pulse signal available at the terminal 194 (of FIGURE 2) may be applied to the input terminals 186 and 188 of the matrix amplifiers, shown in FIGURE 2, to add a fixed amount of pulse signal to the color signals (in addition to the adjustable horizontal and vertical blanking pulses) to insure that no setting of the manual chrominance control can be made to drive the color signals into a blacker than black region.

The video signal processing circuits described herein for use with a penetration color tube provide means for driving the three electron guns of the tube, the cathodes of which are maintained at substantially different direct potentials, in a relatively simple circuit that provides convenient adjustments for both the brightness and color of the reproduced image on the screen of the penetration color tube.

What is claimed is:

1. In a color television receiver having a source of luminance signal, including vertical and horizontal blanking intervals, a luminance signal processing circuit, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance signal translating circuit having a signal input circuit and a signal output circuit;

means for applying said luminance signal from said source of luminance signal to the signal input circuit of said luminance signal translating circuit and to derive a luminance signal in the signal output circuit of said luminance signal translating circuit;

a source of first pulse signals occurring at the rate of the horizontal blanking intervals of said luminance signal;

means for applying said first pulse signals to said luminance signal translating circuit to prevent signal translation therethrough during the application of said first pulse signals to incorporate into said luminance signal a first pulse portion occurring at the rate of said horizontal blanking intervals;

a source of second pulse signals occurring at the rate of the vertical blanking intervals of said luminance signal;

means for applying said second pulse signals to said luminance signal translating circuit to prevent signal translation therethrough during the occurrence of said second pulse signals to incorporate a second pulse portion into said luminance signal occurring at the rate of said vertical blanking intervals;

a plurality of signal coupling means for applying said luminance signal, including said first and second pulse portions, between the control electrodes and cathodes of the electron guns of said cathode ray tube; and a plurality of direct current restoring means each connected individually between said control electrode and the cathode of one of said electron guns of said cathode ray tube for providing a bias voltage between said control electrode and cathode of each of said electron guns and for clamping the peaks of the first and second pulse portions of said luminance signal at said bias voltage such that cathode current in said electron guns is cut off during the occurrence of said first and second pulse portions of said luminance signal.

2. In a color television receiver having a source of luminance signal, including vertical and horizontal blanking intervals, a luminance signal processing circuit, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance signal translating circuit having a signal input circuit and a signal output circuit;

means for applying said luminance signal from said source of luminance signal to the signal input circuit of said luminance signal translating circuit and to derive a luminance signal in the signal output circuit of said luminance signal translating circuit;

a source of first pulse signals occurring at the rate of the horizontal blanking intervals of said luminance signal;

means for applying said first pulse signals to said luminance signal translating circuit to prevent signal translation therethrough during the application of said first pulse signals to incorporate into said luminance signal a first pulse portion occurring at the rate of said horizontal blanking intervals;

a source of second pulse signals occurring at the rate of the vertical blanking intervals of said luminance signal;

means for applying said second signals to said luminance signal translating circuit to prevent signal translation therethrough during the occurrence of said second pulse signals to incorporate a second pulse portion into said luminance signal occurring at the rate of said vertical blanking intervals;

a plurality of signal coupling means for applying said luminance signal, including said first and second pulse portions, between the control electrodes and cathodes of the electron guns of said cathode ray tube;

a plurality of direct current restoring means each connected individually between said control electrode and the cathode of one of said electron guns of said cathode ray tube for providing a bias voltage between said control electrode and cathode of each of said electron guns and for clamping the peaks of the first and second pulse portions of said luminance signal at said bias voltage such that cathode current in said electron guns is cut off during the occurrence of said first and second pulsed portions of said luminance signal;

adjustable brightness control means connected with said luminance signal translating circuit and responsive to said first pulse signals for varying the voltage required to prevent signal translation through said luminance translating circuit to adjust the amplitude of the first and second pulse portions incorporated into the luminance signal to control the brightness of the image reproduced by said cathode ray tube.

3. In a color television receiver having a source of luminance signal, including vertical and horizontal blanking intervals, and a source of demodulated color representative signals, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance signal translating circuit having a signal input circuit and a signal output circuit;

means for applying said luminance signal from said source of luminance signal to the signal input circuit of said luminance signal translating circuit and for deriving a luminance signal from the signal output circuit of said luminance signal translating circuit;

a source of first pulse signals occurring at the rate of the horizontal blanking intervals of said luminance signal;

means for applying said first pulse signals to said luminance signal translating circuit to prevent signal translation therethrough during the application of said first pulse signals and to incorporate into said luminance signal a first pulse portion occurring at the rate of said horizontal blanking interval;

a source of second pulse signals occurring at the rate of the vertical blanking intervals of said luminous signal;

means for applying said second pulse signals to said luminance signal translating circuit to prevent signal translation therethrough during the occurrence of said second pulse signals to incorporate a second pulse portion into said luminance signal occurring at the rate of said vertical blanking intervals;

a matrix circuit;

means for applying said luminance signal including said first and second pulse portions from the signal output circuit of said luminance signal translating circuit and color representative signals from said source of demodulated color representative signals to said matrix circuit for deriving individual color signals therefrom, each individual color signal being representative of the intensity of one of the color components of the image to be reproduced by said television receiver and each including first and second pulse portions corresponding to the first and second pulse portions of said luminance signal;

a plurality of capacitance means for coupling said color signals, including said first and second pulse portions, each individually to one of said control electrodes of the electron guns of said cathode ray tube; and a plurality of direct current restoring means connected individually between the control grids and the cathode of each of said electron guns of said cathode ray tube for providing a bias voltage between the control electrode and cathode of each of said electron guns and for clamping the peaks of the first and second pulse portions of said color signals at said bias voltage such that cathode current in said electron guns is cut off during the occurrence of said first and second pulse portions of said color signals.

4. In a color television receiver having a source of luminance signal, including vertical and horizontal blanking intervals, and a source of demodulated color representative signals, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance signal translating circuit having a signal input circuit and a signal output circuit;

means for applying said luminance signal from said source of luminance signal to the signal input circuit of said luminance signal translating circuit and for deriving a luminance signal from the signal output circuit of said luminance signal translating circuit;

a source of first pulse signals occurring at the rate of the horizontal blanking intervals of said luminance signal;

means for applying said first pulse signals to said luminance signal translating circuit to prevent signal translation therethrough during the application of said first pulse signals and to incorporate into said luminance signal a first pulse portion occurring at the rate of said horizontal blanking interval;

a source of second pulse signals occurring at the rate of the vertical blanking intervals of said luminance signals;

means for applying said second pulse signals to said luminance signal translating circuit to prevent signal translation therethrough during the occurrence of said second pulse signals to incorporate a second pulse portion into said luminance signal occurring at the rate of said vertical blanking intervals;

a matrix circuit;

means for aplying said luminance signal including said first and second pulse portions from the signal output circuit of said luminance signal translating circuit and color representative signals from said source of demodulated color representative signals to said matrix circuit for deriving individual color signals therefrom, each individual color signal being representative of the intensity of one of the color components of the image to be reproduced by said television receiver and each including first and second pulse portions corresponding to the first and second pulse portions of said luminance signal;

a plurality of capacitance means for coupling said color signals, including said first and second pulse portions, each individually to one of said control electrodes of the electron guns of said cathode ray tube;

a plurality of direct current restoring means connected individually between the control grids and the cathodes of each of said electron guns of said cathode ray tube for providing a bias voltage between the control electrode and cathode of each of said electron guns and for clamping the peaks of the first and second pulse portions of said color signals at said bias voltage such that cathode current in said electron guns is cut off during the occurrence of said first and second pulse portions of said color signals; and adjustable brightness control means connected with said luminance signal translating circuit and responsive to said first pulse signals for varying the voltage required to prevent signal translation through said luminance signal translating circuit to adjust the amplitude of the first and second pulse portions incorporated into the luminance signal and the color signals to control the brightness of the image reproduced by said cathode ray tube.

5. In a color television receiver having a source of luminance signal, including vertical and horizontal blanking intervals, and a source of demodulated color representative signals, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance amplifier having a signal input circuit and a signal output circuit;

means for applying said luminance signal from said source of luminance signal to the signal input circuit of said luminance amplifier to develop an amplified luminance signal in the signal output circuit of said luminance amplifier;

a source of first pulse signals occurring at the rate of the horizontal blanking intervals of said luminance signal;

means for applying said first pulse signals to said luminance amplifier in a polarity to cut off said luminance amplifier and prevent signal translation therethrough during the application of said first pulse signals to incorporate into said amplified luminance signal a first pulse portion occurring at the rate of said horizontal blanking intervals;

a source of second pulse signals occurring at the rate of the vertical blanking intervals of said luminance signal;

means for applying said second pulse signals to said luminance amplifier in a polarity to cut off said luminance amplifier and prevent signal translation therethrough during the occurrence of said second pulse signals to incorporate a second pulse portion in said amplified luminance signal occurring at the rate of said vertical blanking intervals;

a matrix circuit;

means for applying said amplified luminance signal including said first and second pulse portions from the signal output circuit of said luminance amplifier and color representative signals from said source of demodulated color representative signals to said matrix circuit for deriving individual color signals therefrom, each individual color signal being representative of the intensity of one of the color components of the image to be reproduced by said television receiver and each including first and second pulse portions corresponding to the first and second pulse portions of said amplified luminance signal;

a plurality of capacitance means for coupling said color signals, including said first and second pulse portions, each individually to one of said control electrodes of the electron guns of said cathode ray tube; and a plurality of direct current restoring means each connected individually between the control electrode and the cathode of one of said electron guns of said cathode ray tube for providing a bias voltage between the control electrodes and cathodes of each of said electron guns and for clamping the peaks of the first and second pulse portions of said color signals at said bias voltage such that cathode current in said electron guns is cut off during the occurrence of said first and second pulse portions of said color signals.

6. In a color television receiver having a source of luminance signal, including vertical and horizontal blanking intervals, and a source of demodulated color representative signals, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance amplifier having a signal input circuit and a signal output circuit;

means for applying said luminance signal from said source of luminance signal to the signal input circuit of said luminance amplifier to develop an amplified luminance signal in the signal output circuit of said luminance amplifier;

a source of first pulse signals occurring at the rate of the horizontal blanking intervals of said luminance signal;

means for applying said first pulse signals to said luminance amplifier in a polarity to cut off said luminance amplifier and prevent signal translation therethrough during the application of said first pulse signals to incorporate into said amplified luminance signal a first pulse portion occurring at the rate of said horizontal blanking interval;

a source of second pulse signals occurring at the rate of the vertical blanking intervals of said luminance signal;

means for applying said second pulse signals to said luminance amplifier in a polarity to cut off said luminance amplifier and prevent signal translation therethrough during the occurrence of said second pulse signals to incorporate a second pulse portion in said amplified luminance signal occurring at the rate of said vertical blanking intervals;

a matrix circuit;

means for applying said amplified luminance signal including said first and second pulse portions from the signal output circuit of said luminance amplifier and color representative signals from said source of demodulated color representative signals to said matrix circuit for deriving individual color signals therefrom, each individual color signal being representative of the intensity of one of the color components of the image to be reproduced by said television receiver and each including first and second pulse portions corresponding to the first and second pulse portions of said amplified luminance signal;

a plurality of capacitance means for coupling said color signals, including said first and second pulse portions, each individually to one of said control electrodes of the electron guns of said cathode ray tube;

a plurality of direct current restoring means each connected individually between the control electrode and the cathode of one of said electron guns of said cathode ray tube for providing a bias voltage between the control electrode and cathode of each of said electron guns and for clamping the peaks of the first and second pulse portions of said color signals at said bias voltage such that cathode current in said electron guns is cut off during the occurrence of said first and second pulse portions of said color signals; and adjustable brightness control means connected with said luminance amplifier and responsive to said first pulse signals for varying the voltage required to cut off said luminance amplifier to adjust the amplitude of the first and second pulse portions incorporated into the amplified luminance signal and the color signals to control the brightness of the image reproduced by said cathode ray tube.

7. In a color television receiver having a source of luminance signal, including vertical blanking intervals, and a source of demodulated color representative signals, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance amplifier having a signal input circuit and a signal output circuit;

means for applying said luminance signal from said source of luminance signal to the signal input circuit of said luminance amplifier to develop an amplified luminance signal in the signal output circuit of said luminance amplifier;

a source of pulse signals occurring at the rate of the vertical blanking intervals of said luminance signal;

means for applying said pulse signals to said luminance amplifier in a polarity to cut off said luminance amplifier and prevent signal translation therethrough during the occurrence of said pulse signals to incorporate a pulse portion in said amplified luminance signal occurring at the rate of said vertical blanking intervals;

a matrix circuit;

means for applying said amplified luminance signal including said pulse portion from the signal output circuit of said luminance amplifier and color representative signals from said source of demodulated color representative signals to said matrix circuit for deriving individual color signals therefrom, each individual color signal being representative of the intensity of one of the color components of the image to be reproduced by said television receiver and each including pulse portions corresponding to the pulse portions of said amplified luminance signal;

a plurality of capacitance means for coupling said color signals, including said pulse portions, each individually to one of said control electrodes of the electron gun of said cathode ray tube; and a plurality of direct current restoring means each connected individually between the control grid and the cathode of one of said electron guns of said cathode ray tube for providing a bias voltage between the grid and cathode of each of said electron guns and for clamping the peaks of the pulse portions of said color signals at said bias voltage such that cathode current in said electron guns is cut off during the occurrence of said pulse portions of said color signals.

8. In a color television receiver having a source of luminance signal, including vertical blanking intervals, and a source of demodulated color representative signals, the combination comprising:

a cathode ray tube having a light emitting phosphor screen and a plurality of electron guns, each of said guns having at least a cathode and a control electrode;

power supply means for said receiver to supply operating potentials to said cathode ray tube for maintaining the cathodes of said electron guns at substantially different direct operating potentials;

a luminance amplifier having a signal input circuit and a signal output circuit;

means for applying said luminance signal from said source of luminance signal to the signal input circuit of said luminance amplifier to develop an amplified luminance signal in the signal output circuit of said luminance amplifier;

a source of pulse signals occurring at the rate of the vertical blanking intervals of said luminance signal;

means for applying said pulse signals to said luminance amplifier in a polarity to cut off said luminance amplifier and prevent signal translation therethrough during the occurrence of said pulse signals to incorporate a pulse portion in said amplified luminance signal occurring at the rate of said vertical blanking intervals;

a matrix circuit;

means for applying said amplified luminance signal including said pulse portion from the signal output circuit of said luminance amplifier and color representative signals from said source of demodulated color representative signals to said matrix circuit for deriving individual color signals therefrom, each individual color signal being representative of the intensity of one of the color components of the image to be reproduced by said television receiver and each including pulse portions corresponding to the pulse portions of said amplified luminance signal;

a plurality of capacitance means for coupling said color signals, including said pulse portions, each individually to one of said control electrodes of the electron gun of said cathode ray tube;

a plurality of direct current restoring means each connected individually between the control grid and the cathode of one of said electron guns of said cathode ray tube for providing a bias voltage between the grid and cathode of each of said electron guns and for clamping the peaks of the pulse portions of said color signals at said bias voltage such that cathode current in said electron guns is cut off during the occurrence of said pulse portions of said color signals; and adjustable brightness control means connected with said luminance amplifier for varying the voltage required to cut off said luminance amplifier to adjust the amplitude of the pulse portions incorporated into the amplified luminance signal and the color signals to control the brightness of the image reproduced by said cathode ray tube.

9. In a color television receiver having a source of luminance signal, including vertical and horizontal blanking intervals, and a source of demodulated color representative signals, the combination comprising:

a cathode ray tube having a light emitting phosphor screen and a plurality of electron guns, each of said guns having at least a cathode, a screen electrode, and a control electrode;

power supply means for said receiver to supply operating potentials to said cathode ray tube for maintaining the cathodes of said electron guns at substantially different direct operating potentials;

a luminance signal translating circuit having a signal input circuit and a signal output circuit; means for applying said luminance signal from said source of luminance signal to the signal input circuit of said luminance signal translating circuit and for deriving a luminance signal from the signal output circuit of said luminance signal translating circuit;

a source of first pulse signals of both a positive and negative polarity occurring at the rate of the horizontal blanking intervals of said luminance signal;

means for applying said first pulse signals of a negative polarity to said luminance signal translating circuit to prevent signal translation therethrough during the application of said first pulse signals and to incorporate into said luminance signal a first pulse portion occurring at the rate of said horizontal blanking intervals;

a source of second pulse signals occurring at the rate of the vertical blanking intervals of said luminance signal;

means for applying said second pulse signals to said luminance signal translating circuit to prevent signal translation therethrough during the occurrence of said second pulse signals to incorporate a second pulse portion into said luminance signal occurring at the rate of said vertical blanking intervals;

a matrix circuit;

means for applying said luminance signal including said first and second pulse portions from the signal output circuit of said luminance signal translating circuit and color representative signals from said source of demodulated color representative signals to said matrix circuit for deriving individual color signals therefrom, each individual color signal being representative of the intensity of one of the color components of the image to be reproduced by said television receiver and each including first and second pulse portions corresponding to the first and second pulse portion of said luminance signal;

a plurality of capacitance means for coupling said color signals, including said first and second pulse portions, each individually to one of said control electrodes of the electron guns of said cathode ray tube;

a plurality of direct current restoring means connected individually between the control grids and the cathodes of each of said electron guns of said cathode ray tube for providing first direct operating voltages between the control electrodes and cathodes of each of said electron guns and for clamping the peaks of the first and second pulse portions of said color signals at said first direct operating voltage such that cathode current in said electron guns is cut off during the occurrence of said first and second pulse portions of said color signals;

adjustable brightness control means connected with said luminance signal translating circuit and responsive to said first pulse signals of negative polarity for varying the voltage required to prevent signal translation through said luminance signal translating circuit to adjust the amplitude of the first and second pulse portions incorporated into the luminance signal and the color signals to control the brightness of the image reproduced by said cathode ray tube, a plurality of rectifier circuit means each connected separately between the cathodes and screen electrodes of each of said electron guns;

means for applying said first pulse signals of positive polarity to said plurality of rectifier circuit means to develop second direct operating voltages on each of said screen electrodes; and means for varying one of said direct operating voltages to vary the current cut off bias for said electron guns.

References Cited by the Examiner

UNITED STATES PATENTS

| | | | |
|---|---|---|---|
| 2,965,705 | 12/1960 | Luther | 178—5.4 |
| 2,967,262 | 1/1961 | Madey. | |
| 3,043,909 | 7/1962 | Loughlin | 178—7.5 |
| 3,056,853 | 10/1962 | Espenlaub | 178—5.4 |
| 3,059,140 | 10/1962 | Heuer | 315—13 |
| 3,062,914 | 11/1962 | Fernald et al. | 178—5.4 |
| 3,113,237 | 12/1963 | Schopp et al. | 315—31 |
| 3,204,143 | 8/1965 | Pritchard | 198—5.4 |

DAVID G. REDINBAUGH, *Primary Examiner.*

ROBERT SEGAL, *Examiner.*

J. A. O'BRIEN, *Assistant Examiner.*